(12) United States Patent
Wijetunge et al.

(10) Patent No.: US 9,788,321 B2
(45) Date of Patent: Oct. 10, 2017

(54) METHOD AND APPARATUS FOR RESOURCE ALLOCATION IN A WIRELESS COMMUNICATION NETWORK

(71) Applicant: CELLOS SOFTWARE LTD, Melbourne, VIC (AU)

(72) Inventors: Sumudu Prasad Wijetunge, Mulgrave (AU); Kumbesan Sandrasegaran, Baulkham Hills (AU); Abhijit Shamkant Atale, Waterfront Key (SG)

(73) Assignee: CELLOS SOFTWARE LTD, Melbourne, VIC (AU)

( * ) Notice: Subject to any disclaimer, the term of this patent is extended or adjusted under 35 U.S.C. 154(b) by 176 days.

(21) Appl. No.: 14/630,602

(22) Filed: Feb. 24, 2015

(65) Prior Publication Data

US 2015/0257155 A1    Sep. 10, 2015

Related U.S. Application Data

(60) Provisional application No. 61/948,153, filed on Mar. 5, 2014.

(51) Int. Cl.
  *H04W 72/04*   (2009.01)
  *H04L 5/00*    (2006.01)
  *H04W 72/08*   (2009.01)

(52) U.S. Cl.
  CPC ....... *H04W 72/0453* (2013.01); *H04L 5/0048* (2013.01); *H04W 72/048* (2013.01); *H04W 72/085* (2013.01)

(58) Field of Classification Search
  None
  See application file for complete search history.

(56) References Cited

U.S. PATENT DOCUMENTS

| | | | | |
|---|---|---|---|---|
| 2010/0197314 | A1* | 8/2010 | Maaref | H04W 16/04 455/450 |
| 2010/0273492 | A1* | 10/2010 | Liu | H04B 7/022 455/446 |
| 2011/0003598 | A1 | 1/2011 | Ma et al. | |
| 2011/0053589 | A1* | 3/2011 | Kimura | H04W 16/10 455/424 |
| 2011/0158190 | A1 | 6/2011 | Kuwahara et al. | |
| 2012/0252469 | A1* | 10/2012 | Okino | H04W 16/10 455/449 |

(Continued)

*Primary Examiner* — Kibrom T Hailu
(74) *Attorney, Agent, or Firm* — Blakely Sokoloff Taylor & Zafman LLP

(57) ABSTRACT

The invention provides method and apparatus for resource allocation in wireless communication network. The method comprises: determining each UE in each cell of a cluster to be a CE UE or CC UE according to pilot signal strength reported by the UE; dividing available frequency band into two non-overlapping frequency bands of CE frequency band and CC frequency band based on the number of CC UEs and the number of CE UEs in the cluster; assigning non-overlapping portion from the CE frequency band to each cell based on at least one number associated with CE UEs in each cell; assigning at least one resource block (RB) from the CC frequency band to each CC UE in each cell; and assigning at least one RB from the assigned non-overlapping portion from the CE frequency band to each cell of the cluster to each CE UE in the corresponding cell.

14 Claims, 11 Drawing Sheets

(56) References Cited

U.S. PATENT DOCUMENTS

| | | | |
|---|---|---|---|
| 2013/0005380 A1* | 1/2013 | Nobukiyo | H04W 72/06 455/512 |
| 2013/0109401 A1* | 5/2013 | Ma | H04W 72/0426 455/452.1 |
| 2014/0092823 A1* | 4/2014 | Song | H04L 1/00 370/329 |

* cited by examiner

METHOD AND APPARATUS FOR RESOURCE ALLOCATION IN A WIRELESS COMMUNICATION NETWORK

FIELD

The invention is generally (but not exclusively) related to a Cloud Radio Access Network (C-RAN) system architecture which employs methods of downlink resource allocation in a wireless communication network.

BACKGROUND

In contrast to a conventional Third Generation Project Partnership (3GPP) Universal Mobile Telecommunications System (UMTS) system where base stations (Node B) are connected to each other via Radio Network Controllers (RNC), the base stations (eNodeBs or eNBs) of a 3GPP Long Term Evolution (LTE) system may be connected to one another directly without a RNC. However, conventional eNodeBs conforming to the 3GPP LTE standard typically require significant upfront Capital Expenditure (CAPEX) (such as real estate costs for housing the eNodeB) and ongoing Operational Expenditure (OPEX) (such as energy costs for powering the eNodeB). Thus, there is a need for an improved or alternative system. Another significant challenge to LTE network operators relates to inter-cell interference which causes poor radio services at cell edge.

In this context, there is a need for solutions to provide a method, a communication apparatus or a system to reduce CAPEX or OPEX of wireless communication network operators and also resolves the problem of inter-cell interference by methods of packet scheduling/resource allocation in the wireless communication network.

SUMMARY

Embodiments of the invention provide a method for resource allocation in a wireless communication network comprising a base station server and a plurality of base station client at physical locations of cells to reduce CAPEX or OPEX of wireless communication network operators and inter-cell interference. The method for resource allocation comprises:

determining, at a base station server, each user equipment (UE) in each cell of a cluster to be a cell edge (CE) UE or a cell centred (CC) UE according to pilot signal strength reported by the UE;

dividing, at the base station server, available frequency band into two non-overlapping frequency bands of CE frequency band and CC frequency band based on the number of CC UEs and the number of CE UEs in the cluster;

assigning, at the base station server, non-overlapping portion from the CE frequency band to each cell of the cluster based on at least one number associated with the CE UEs in each cell of the cluster;

assigning, at the base station server, at least one resource block (RB) from the CC frequency band to each CC UE in each cell of the cluster; and assigning, at the base station server, at least one RB from the assigned non-overlapping portion from the CE frequency band to each cell of the cluster to each CE UE in the corresponding cell.

According to one embodiment of the invention, the step of determining each UE in each cell of the cluster to be a CE UE or a CC UE according to the pilot signal strength reported by the UE, may comprise:

determining the UE to be a CC UE by the base station server if the pilot signal strength reported by the UE in its serving cell of the cluster is greater than pilot signal strength reported by the UE in any other cell of the cluster by a predetermined threshold; and determining the UE to be a CE UE by the base station server if the pilot signal strength reported by the UE in any cell of the cluster is not greater than the pilot signal strength reported by the UE in any other cell in the cluster by the predetermined threshold.

According to one embodiment of the invention, the step of dividing the available frequency band into the CE frequency band and the CC frequency band based on the number of CC UEs and CE UEs in the cluster, may comprise:

calculating, at the base station server, a change factor based on the number of CC UEs and the number of CE UEs in the cluster and dividing the available frequency band into the CC frequency band and the CE frequency band based on the calculated change factor.

According to one embodiment of the invention, the non-overlapping portion from the CE frequency band assigned to each cell may be determined using a user based allocation algorithm. The step of assigning the non-overlapping portion from the CE frequency band to each cell of the cluster based on at least one number associated with the CE UEs in each cell, may further comprise:

calculating the number of CE RBs in the CE frequency band to be assigned to a cell of the cluster based on the number of CE UEs in the cell, the total number of CE UEs in all cells within the cluster, and the number of CE RBs in the CE frequency band.

According to another embodiment of the invention, the non-overlapping portion from the CE frequency band assigned to each cell may be determined using a Quality of Service (QoS) based allocation algorithm. The step of assigning the non-overlapping portion from the CE frequency band to each cell of the cluster based on at least one number associated with the CE UEs in each cell, may further comprise:

calculating a CE weight for each cell of the cluster according to the number of non-real time CE UEs and the number of real time CE UEs in the cell, and calculating the number of CE RBs to be assigned to each cell of the cluster based on the calculated CE weight of each cell, the sum of CE weight of all the cells of the cluster, and the number of CE RBs in the CE frequency band.

In one embodiment of the invention, the step of assigning the non-overlapping portion from the CE frequency band to each cell of the cluster based on at least one number associated with the CE UEs, may further comprise:

sorting cells of the cluster by the number of CE RBs assigned to the cells respectively;

assigning allocation priority to each cell of the cluster according to the number of CE RBs assigned to the cell; and determining an initial location of CE RBs in the CE frequency band to be assigned to each cell of the cluster according to the allocation priority assigned to each cell.

In another embodiment of the invention, the step of assigning the non-overlapping portion from the CE frequency band to each cell of the cluster based on at least one number associated with the CE UEs in each cell, further comprises:

sorting cells of the cluster by the number of CE RBs assigned to the cells respectively;

assigning allocation priority to each cell of the cluster according to the number of CE RBs assigned to the cell; and determining CE RBs in the CE frequency band to be assigned to each cell of the cluster according to the allocation priority assigned to the cell and pilot signal strength corresponding to the CE RBs in the CE frequency band, wherein the pilot signal strength is reported by the CE UEs in the corresponding cell.

According to one embodiment of the invention, after the step of assigning non-overlapping portion from the CE frequency band to each cell of the cluster based on the number of CE UEs in each cell, the method may further comprise:

generating a list of neighbouring and interfering cells for each cell of the cluster; and for each cell, re-allocating to at least one CE UE in the cell with at least one RB from CE RBs assigned to a cell which is not in the list of neighbouring and interfering cells.

The embodiments of the invention also provide a communication apparatus for resource allocation in a wireless communication network. The apparatus comprises:

a networking interface connected to a plurality of base station clients and a core network of the wireless communication system, and a cluster-level scheduler, wherein the cluster-level scheduler comprises:
 a classifier for classifying each user equipment (UE) in each cell of a cluster to be a cell edge (CE) UE or a cell centred (CC) UE according to pilot signal strength reported by the UE;
 a divider for dividing available frequency band into two non-overlapping frequency bands of CE frequency band and CC frequency band based on the number of CC UEs and the number of CE UEs in the cluster;
 a resource allocator for assigning non-overlapping portion from the CE frequency band to each cell of the cluster based on at least one number associated with the CE UEs in each cell of the cluster;
 assigning at least one resource block (RB) from the CC frequency band to each CC UE in each cell of the cluster; and
 assigning at least one RB from the assigned non-overlapping portion from the CE frequency band to each cell of the cluster to each CE UE in the corresponding cell.

With the method and communication apparatus for resource allocation disclosed in the embodiments of the invention, the costs of CAPEX and OPEX of the operators for the wireless communication network will be reduced since the wireless communication network is based on a C-RAN arrangement where baseband processing conventionally performed by a conventional eNodeB is split/distributed between a base station server and a base station client. Also the inter-cell interference in a cluster will be reduced drastically by using ICI avoidance strategies proposed in the embodiments of the invention. This will be proved with simulation results for embodiments of the invention in the detailed description below.

BRIEF DESCRIPTION OF DRAWINGS

Embodiments of the invention will now be described by way of example only with reference to the accompanying drawings, in which.

DETAILED DESCRIPTIONS OF EXEMPLARY EMBODIMENTS

Figure 1:
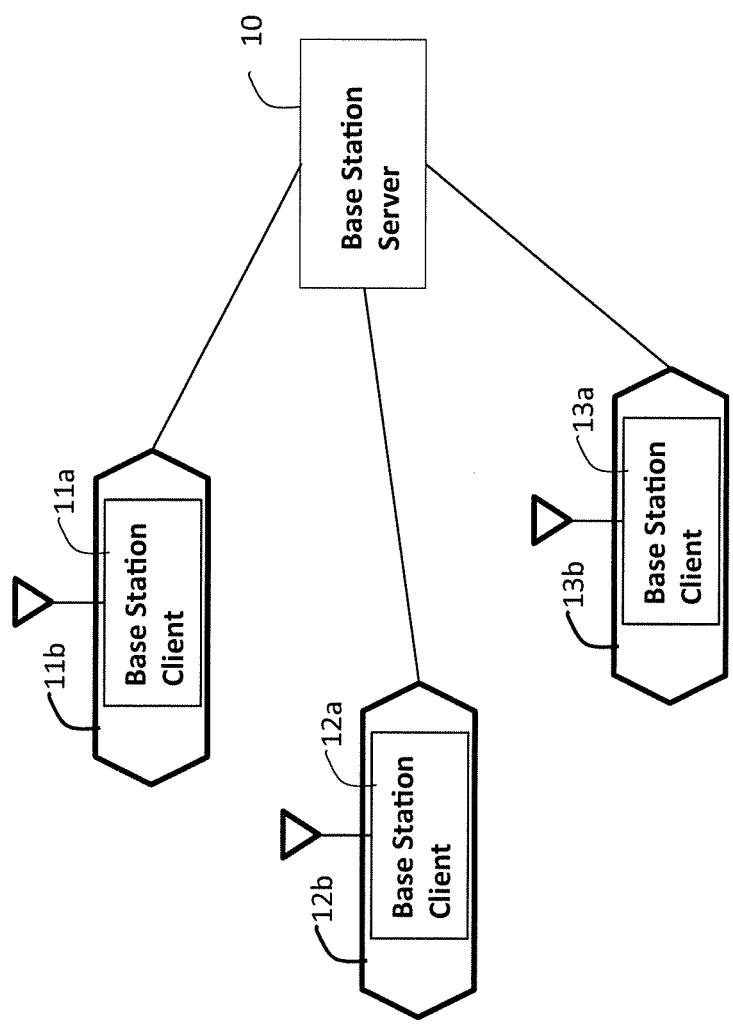
FIG. 1 is a schematic diagram of a wireless communication system according to one embodiment of the invention.

FIG. 1 is a schematic diagram of a wireless communication system according to one embodiment of the invention. As shown in FIG. 1, the wireless communication system 1 conforms to the 3GPP LTE standard, and is based on a Cloud-Random Access Network (C-RAN) arrangement where baseband processing conventionally performed by a conventional eNodeB is split/distributed between a base station server 10 (also referred to as a base station hotel) and a base station client 11a, 12a, 13a (also referred to as a cell site equipment or a Remote Radio Head Unit (RHU)). However, the invention is not limited to 3GPP LTE standard and can be applied to any wireless communication system employing cellular network system.

In the system 1 of FIG. 1, there is provided one base station server 10 and three base station clients 11a, 12a, 13a. Persons skilled in the art will appreciate that the system 1 may include one, two or more than three base station clients 11a, 12a, 13a.

Each base station client 11a, 12a, 13a is located at a respective one of a plurality of cell sites (or antenna towers) 11b, 12b, 13b remote from the location of the base station server 10, and is connected to the base station server 10 via an optical fibre link. Persons skilled in the art will appreciate that one or more of the base station clients 11a, 12a, 13a may alternatively be connected to the base station server 10 via a different type of link such as a high-speed wireless link.

It is envisaged that the base station server 10 may be connected to other base station servers, conventional eNodeBs via a connection point (such as a General Packet Radio Service (GPRS) Tunneling Protocol-User plane (GTP-U) Tunnel end point) at a core network (such as an Evolved Packet Core (EPC)). Also, it is envisaged that the system 1 may support multiple bands and be scaled by increasing the number of base station clients 11a, 12a, 13a and the capacity of the base station server 10 (for example, by increasing the number of baseband processing units in the base station server 10).

Figure 2:
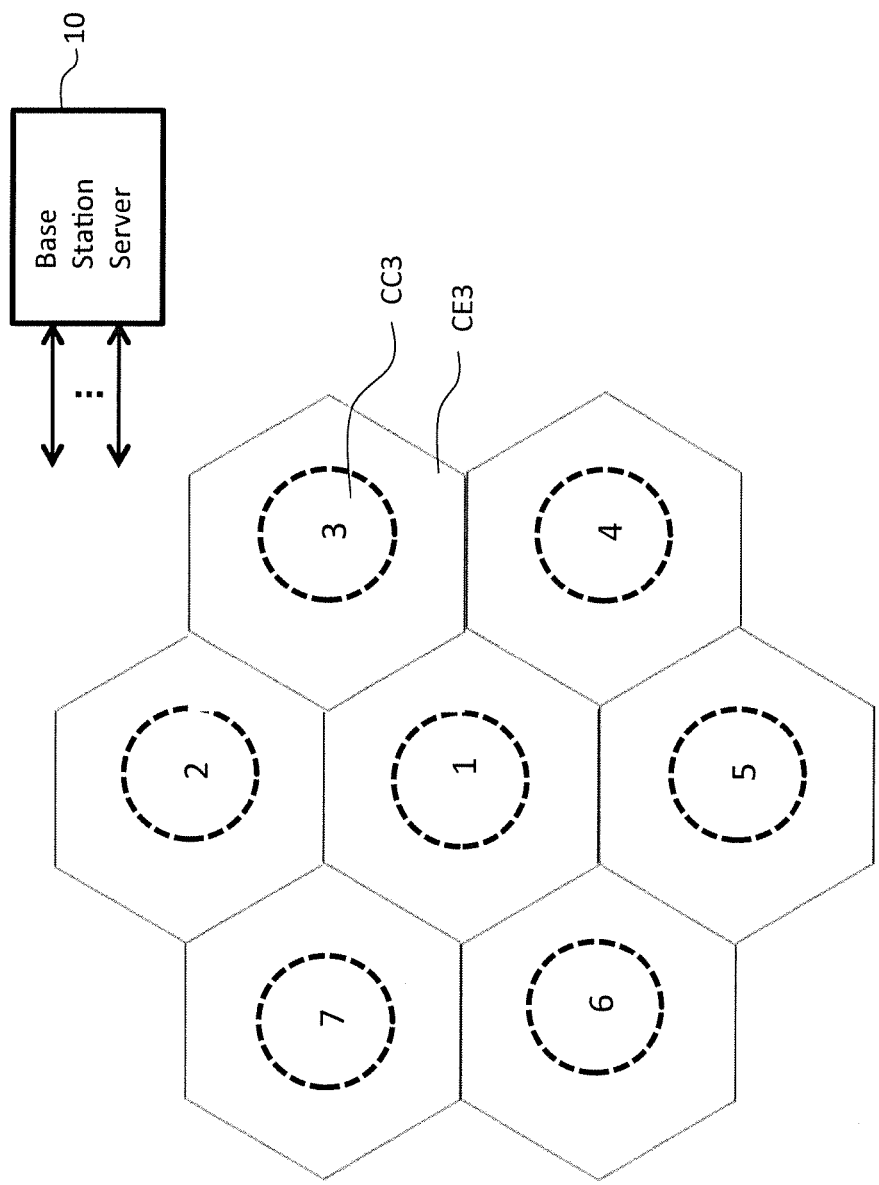
FIG. 2 is a schematic diagram of a cluster consisting of 7 cells according to one embodiment of the invention.

FIG. 2 is a schematic diagram of a cluster consisting of 7 cells according to one embodiment of the invention. The method of resource allocation in the invention can be applied in a cluster, for instance, a cluster consisting of cells 1-7. As shown in FIG. 2, each cell is hexagon with a cell centre region and a cell edge region. The cell centre region can be regarded as area enclosed in dashed circle line in every cell. For instance, the area labelled as CC3 is the cell centre region of the cell 3. The cell edge region is shown in region outside the dashed circle line but still confined within the edge of the hexagon. For instance, the area labelled as CE3 is the cell edge region of the cell 3. In 3GPP LTE or LTE-Advanced communication system, the base station/eNodeB can allocate the same set of Radio Blocks (RB) to UEs under its coverage. For instance, the RBs may consist of a block of frequency band resources/subbands and timeslot resources/subframes. However, if every base station and eNodeB transmits all resource blocks (RBs) to all UEs, it is anticipated that Inter-cell Interference (ICI) may arise, and the cell edge UE will be greatly impacted. In the invention, the LTE communication system refers to a wireless communication system supporting 3GPP Technical Specifications Release 8, 9; the LTE-Advanced communication system refers to wireless communication system supporting 3GPP Technical Specifications Release 10 and future releases.

Figure 3:
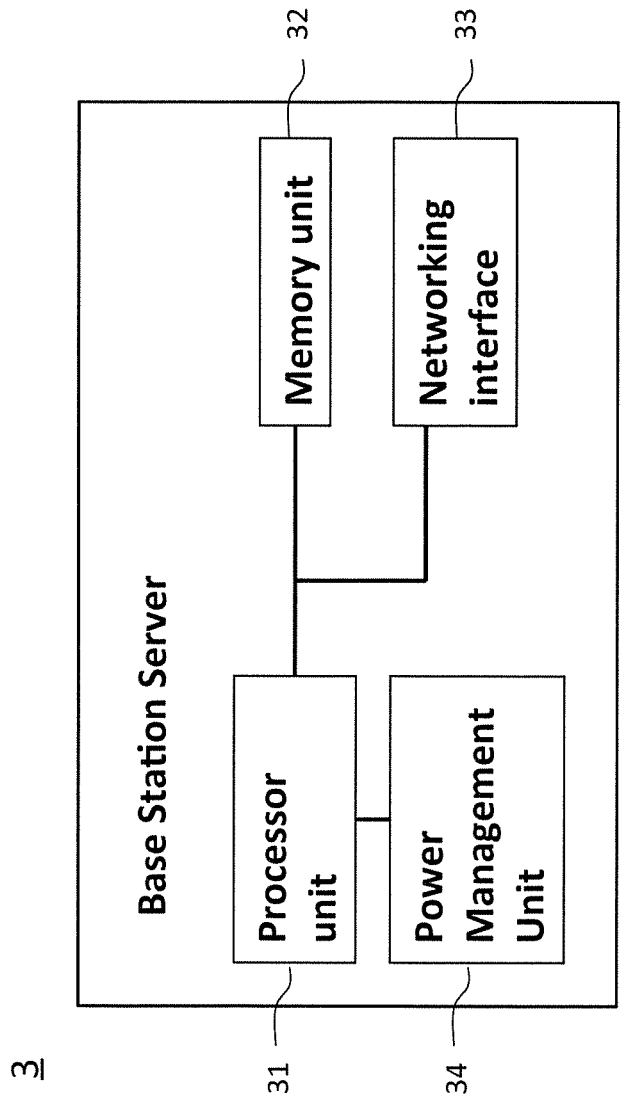
FIG. 3 is a block diagram illustrating the physical components of an exemplary virtual cloud platform (VCP) on which the base station server in FIG. 1 is implemented according to one embodiment of the invention.

FIG. 3 is a block diagram illustrating the physical components of an exemplary VCP 3 on which the base station server 10 in FIG. 1 is implemented according to one embodiment of the invention. The VCP 3 includes a processor unit 31, a memory unit 32, a networking or input/output interface 33 and a power management unit 34. The processor unit 31 is logically or electrically connected to the memory unit 32, the networking or input/output interface 33 and the power management unit 34. It is envisaged that the VCP 3 may be a blade server, and the processor unit 31 may be a multi-core processor. The memory unit 32 may include static memory storage devices and dynamic memory storage devices.

The processor unit 31 is configured to implement (or execute) a number of software modules based on program code and/or data stored in the memory unit 32. For example, the memory unit 32 stores program code for implementing software modules such as Radio Resource Control (RRC) processing entity, the Packet Data Convergence Protocol (PDCP) processing entity, the Radio Link Control (RLC) processing entity, the MAC/PHY processing, a cluster packet scheduler and/or a VCP packet scheduler entity. Persons skilled in the art will appreciate that one or more of the software modules could alternatively be implemented in some other way, for example, by one or more dedicated electronic circuits.

The networking or input/output interface 33 is an interface configured for connecting each baseband unit (BBU) at the VCP 3 with each base station client 11a, 12a, 13a. The power management unit 34 includes a power supply (not shown) configured to provide electrical power to the VCP 3 and management logics (not shown) configured to control power supply to the VCP 3.

Figure 4:
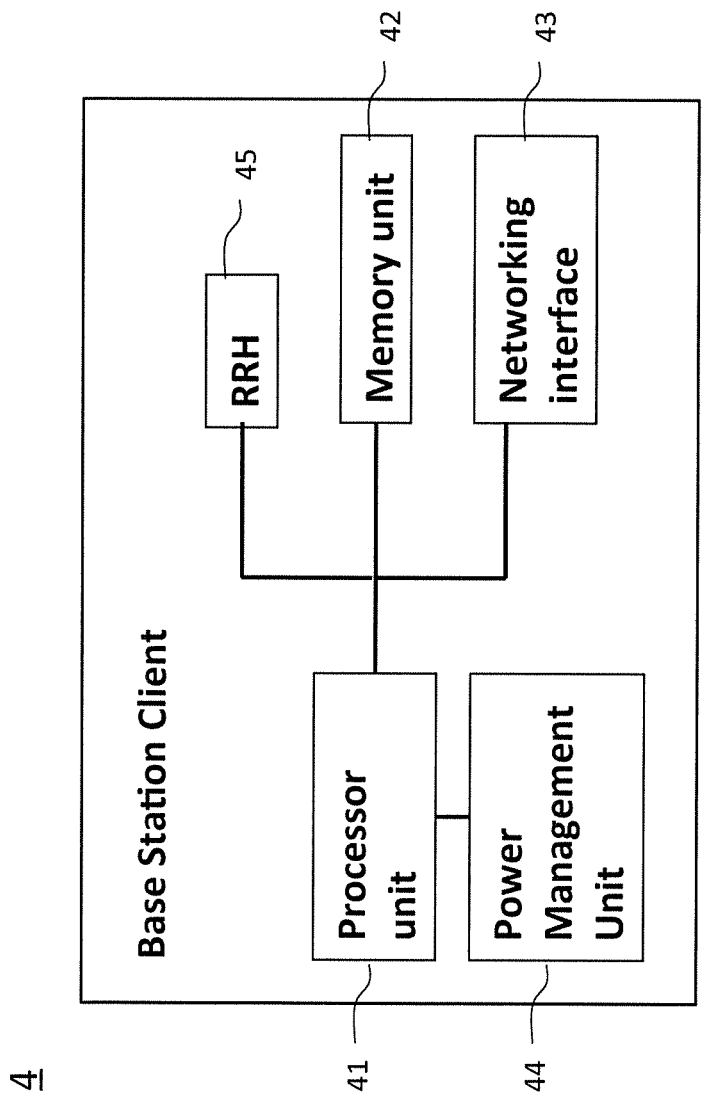
FIG. 4 is a block diagram illustrating the physical components of any base station client in FIG. 1 according to one embodiment of the invention.

FIG. 4 is a block diagram illustrating the physical components of any of the base station client 11a, 12a, 13a in FIG. 1 according to one embodiment of the invention. Each base station client 11a, 12a, 13a includes a processor unit 41, a memory unit 42, a networking or input/output interface 43, a power management unit 44, and a Remote Radio Head (RRH) 45. The RRH 45 comprises Radio Frequency (RF) circuitry conforming to the 3GPP LTE standard. It is envisaged that the RRH 45 may include an antenna (not shown) and RF signal processing components (not shown) such as, but not limited to, a digital-to-analogue signal converter (DAC), an analogue-to-digital signal converter (ADC), an oscillation signal generator, a modulator, a demodulator, a power amplifier, and a bandpass filter.

The processor unit 41 is logically or electrically connected to the memory unit 42, the networking or input/output interface 43, the power management unit 44, and the RRH 45. It is envisaged that the processor unit 41 may be a multi-core processor. The memory unit 42 may include static memory storage devices and dynamic memory storage devices. The processor unit 41 is configured to implement (or execute) a number of software modules based on program code and/or data stored in the memory unit 42. For example, the memory unit 42 may store program code for implementing software modules corresponding to a MAC/PHY processing entity corresponding to the MAC/PHY processing entity 214. Persons skilled in the art will appreciate that one or more of the software modules could alternatively be implemented in some other way, for example, by one or more dedicated circuits.

The networking or input/output interface 43 is an interface configured for connecting the base station client to the base station server 10. The power management unit 44 includes a power supply (not shown) configured to supply electrical power to the base station client and management logics (not shown) configured to control power supply to the base station client 11a, 12a, 13a.

Figure 5:
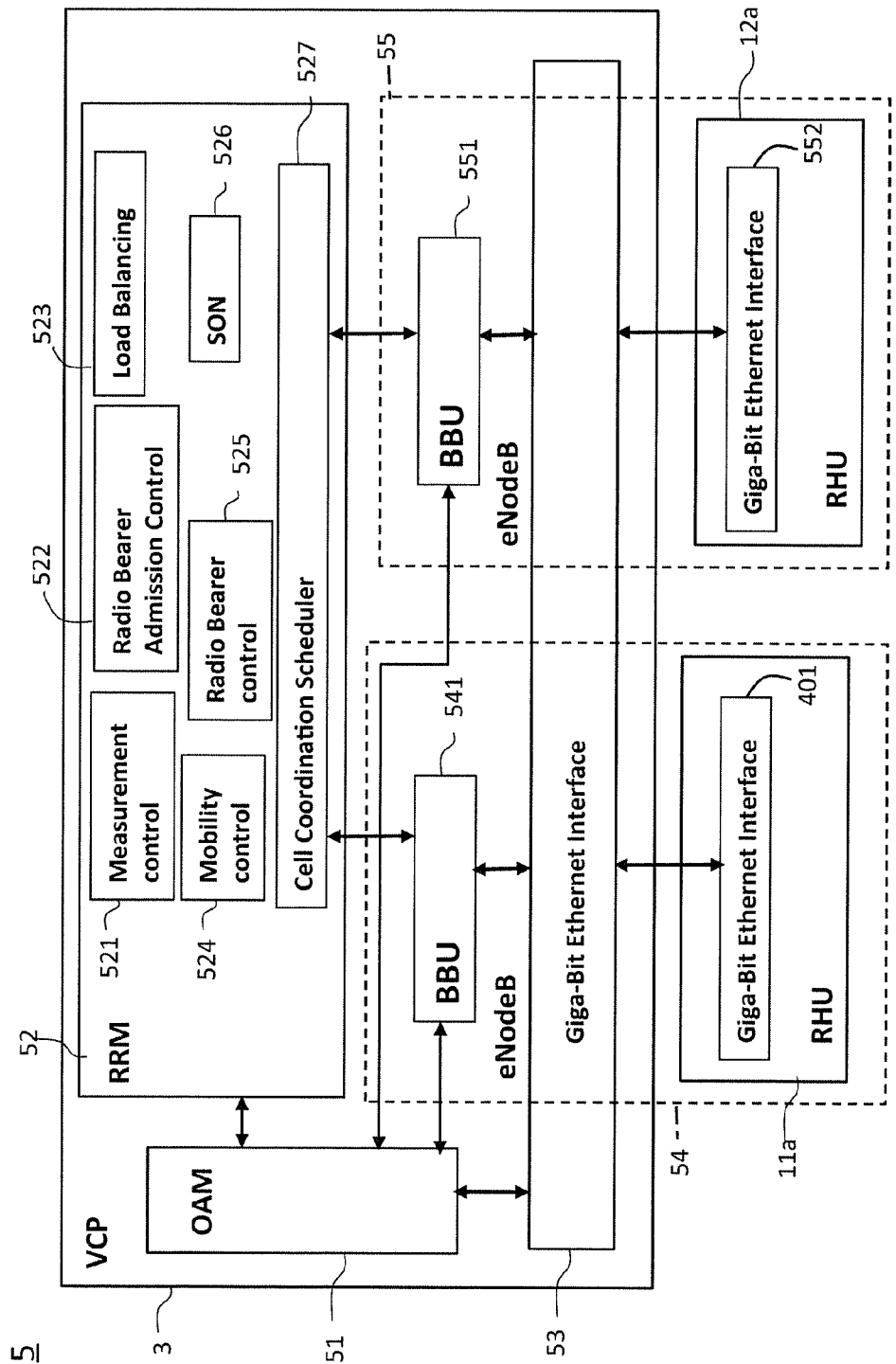
FIG. 5 is a schematic diagram of the functional components (shared functional components) implemented on the VCP to manage the baseband units (BBUs) located at the base station server according to one embodiment of the invention.

FIG. 5 is a schematic diagram of the functional components (shared functional components) implemented on the VCP 3 to manage the baseband units (BBUs) located at the base station server 10 according to one embodiment of the invention. In FIG. 5, the system 5 is a part of the system 1 (more specifically, only two of the BBUs 541, 551 and two of the base station clients 11a, 12a) is illustrated. Persons skilled in the art will appreciate that the VCP 3 can include more than 2 BBUs respectively connected to their base station clients. In FIG. 5, the baseband processing conventionally performed by a conventional eNodeB is performed by an eNodeB 54, 55 comprising a BBU 541, a BBU 551 and a corresponding base station client 11a, 12a.

The VCP 3 comprises a carrier Ethernet Internet Protocol (IP) interface in the form of a Giga-bit Ethernet interface 53. Each BBU 541, 551 is connected to a corresponding base station client 11a, 12a via the Giga-bit Ethernet interface 53 and a Giga-bit Ethernet interface 401, 552 of the base station client 11a, 12a.

The VCP 3 also includes a Radio Resource Management (RRM) 52 including: a measurement control entity 521, a radio bearer admission control entity 522, a load balancing entity 523, a mobility control entity 524, a radio bearer control entity 525, a Self-Organizing Network (SON) entity 526 and a cell coordination scheduler 527. Each BBU 541, 551 is connected to the measurement control entity 521, the radio bearer admission control entity 522, the load balancing entity 523, the mobility control entity 524, the radio bearer control entity 525 and the SON entity 526 via the cell coordination scheduler 527. The cell coordination scheduler 527 is arranged to perform radio resource allocation and packet scheduling for each BBU 541, 551 and corresponding base station client 11a, 12a. The cell coordination scheduler 527 implements the cluster packet scheduler.

The measurement control entity 521 is arranged to control broadcasting or transmission of dedicated control/signalling information such that a UE corresponding to a BBU can, according to the control/signalling information, perform measurements for intra/inter-frequency mobility. The radio bearer admission control entity 522 is arranged to determine whether a new radio bearer can be accepted by the system 5, according to currently available radio resource (such as the currently available radio resource of the serving cell base station client 11a, 12a). The load balancing entity 523 is arranged to perform load balancing algorithms (such as intra-frequency, inter-frequency or inter-RAT reselections/handovers). The mobility control entity 524 is arranged to perform determinations related to mobility of UEs (for example, during handover and Tracking Area Update (TAU)). The radio bearer control entity 525 is arranged to establish, maintain, and release radio bearers, and to configure radio resources associated with radio bearers. The SON entity 526 is arranged to exchange information (such as an Automatic Neighbour Relation function) between neighbouring eNodeBs 54, 55. It is also envisaged that the SON entity 526 may perform automatic Physical Cell Identity (PCI) selection, dynamic configuration of X2/S1 interfaces, Random Access Channel (RACH) parameter optimization, and mobility parameter optimization.

The VCP 3 also includes an operation administration monitoring (OAM) entity 51. The OAM entity 51 is logically connected to the RRM entity 52, each BBU 541, 551 and the Giga-bit Ethernet interface 53. The OAM entity 51 is arranged to perform OAM/control operations. In particular, the OAM entity 51 performs OAM/control of a MAC sub-layer processing entity (not shown) and a PHY sub-layer processing entity (not shown). It is envisaged that such OAM/control typically involves relevant MAC and PHY sub-layers configuration information. It is envisaged that the OAM entity 51 may interact with the RRM entity 52 and directly transmit/receive control/signalling information to/from a RRC sub-layer processing entity (not shown) of each BBU 541, 551. Also, the OAM entity 51 may transmit/receive, over the Giga-bit Ethernet interface 53, OAM/control and configuration information to/from a corresponding OAM entity (not shown) of each base station client 11a, 12a.

In C-RAN, the cooperation among cells is important because it can greatly help to reduce the Inter-cell Interference (ICI). C-RAN may require integrated Packeting Scheduling (PS) and ICI solutions to make the best benefits of this new architecture.

In order to solve ICI problem in a LTE system, embodiments of the invention provide a method which applies a dynamic ICI avoidance strategy so as to allocate RBs to UEs in every cell in the cluster shown in FIG. 1. The method in embodiments of the invention may contain following steps: (a) Determine the amount of resource blocks (RBs) allocated to cell-centre (CC) UEs, and the remaining amount of RBs allocated to cell-edge (CE) UEs; (b) Initial allocation of number of cell-edge (CE) resource blocks for each cell; (c) Configure initial location (or exact allocation) of CE resource blocks to each cell; (d) Improved/additional allocation of CE resource blocks to each cell; (e) Intra-cell resource allocation; (f) Additional improvement suited for wireless communication system when there are a number of component carriers.

The method of allocating radio resource in cluster by using dynamic ICI avoidance can be applied to any C-RAN network under all kinds of practical conditions with reduced or no interference between cells while it also provides good and fair packet scheduling within each cell in the configured cluster. The method of allocating radio resource in cluster by using dynamic ICI avoidance may be explained along with a cluster composed of C cells (e.g., C=7 cells) with centralized control in which all available RBs are used at least once during a configured interval. The cluster of 7 cells shown in FIG. 2 is merely an example but not intended to limit the scope of the invention. Persons skilled in the art will appreciate that the number of cells in each cluster is set by planning and optimization team within a mobile operator.
Determine the Amount of Resource Blocks Allocated to Cell-Centred UE, and the Remaining Amount of Resource Blocks Allocated to Cell-Edge UE In the method of radio resource allocation in a cluster by using dynamic ICI avoidance, the first step is to determine a boundary of RBs allocated to CC UEs and CE UEs, i.e. a boundary between cell-centred frequency band/cell-centred band, and cell-edge frequency band/cell-edge band. For instance, the boundary of RBs allocated to CC UEs and CE UEs may be similar to that shown in FIG. 6.

Figure 6:
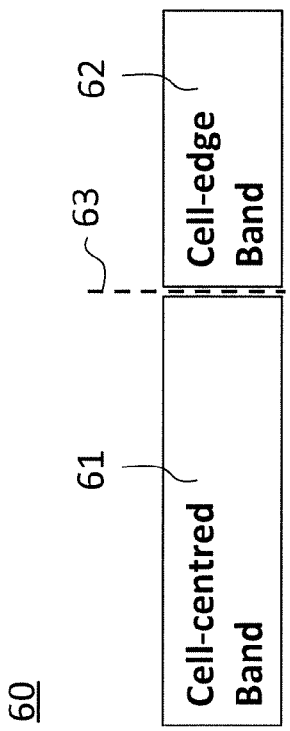
FIG. 6 is a schematic diagram illustrating a boundary between cell-centred band and cell-edge band according to one embodiment of the invention.

FIG. 6 is a schematic diagram illustrating a boundary between cell-centred band and cell-edge band according to one embodiment of the invention. As shown in FIG. 6, a continuous radio frequency band 60 in a cell can be dynamically separated by a RB boundary line 63 into a cell-centred band 61 and a cell-edge band 62. For example, the cell coordination scheduler 527 of the VCP 3 may dynamically determine the RB boundary line 63. As shown in FIG. 2, the eNodeBs in the cluster of 7 cells are communicatively connected to a base station server and are also centrally controlled by the base station server.

The base station server, e.g. the base station server 10 in FIG. 1, may be considered as a Digital Unit (DU) or a DU cloud, which controls all C cells within a cluster, and the base station server collects feedback information from users/UEs and decides how to allocate radio resources to each UE. Resource block (RB) in the invention is same as PRB (Physical RB or a pair of RB). It is envisaged that there are R of RBs in each cell, where R is defined as the number of RBs in each cell. An exemplary radio resource allocation scheme may be that the available bandwidth is divided into 2 parts: cell-centred (CC) band, and cell-edge (CE) band. For example, if R=100 then $R_{CC}$=60 RBs and $R_{CE}$=40 RBs. In a first step, a change factor F is defined as the ratio of number of CC Users to total number of Users in the same cell or in the same configured cluster according to the Equation (1). Typically, the division of the available bandwidth varies with any change of the change factor.

$$F = \frac{\text{Number of } CC \text{ Users}}{\text{Number of } CE \text{ Users} + \text{Number of } CC \text{ Users}} = \frac{N_{CC}}{N_{CE} + N_{CC}}$$

Equation 1

For example, if there are 120 CC users and 80 CE users then F is 120/200 or 3/5. In the method of allocating radio resource in cluster by using dynamic ICI avoidance, the value of F may vary after a configured window interval period P (e.g., 20 ms). If there are more users in cell-edge region, then more RBs can be shifted to the cell-edge band 62. Alternatively, the radio resources allocated to CE UEs and CC UEs may be determined based on downlink traffic for each user category, i.e. CE UEs and CC UEs.

For each user in a cell, the eNodeB with the greatest pilot signal strength is the serving cell. For each transmit time interval (TTI) or a configured window interval period P, users are divided into cell-centred (CC) users or cell-edge (CE) users based on the reported signal-to-interference-noise-ratio (SINR).

For example, if the pilot signal strength (or SINR) of a serving cell reported by a UE A is greater than pilot signal strengths (or SINR) of other cells by a threshold amount delta Δ, (which can be set or predetermined by mobile network operator or according to an algorithm), the VCP 3 can consider this UE A as a CC user. The cell coordination scheduler 527 of the VCP 3 may allocate this UE A to use the full CC band 61 of its serving cell.

For another example, when another UE B respectively receives 2 or more pilot signals from 2 or more cells nearly equal pilot signal strength, the VCP 3 may consider this UE as a CE user and thus allocate this UE B with RB(s) from CE bands. In order to reduce system complexity, preferably, any change in the change factor F will result in a change to the number of CE RBs. One possible way is that when the change factor changes by a predetermined value ΔF, the CE RBs will increase or decrease a fixed size of CE RBs, e.g. increase or decrease CE RBs by 5 RBs when the change factor changes by ΔF=0.1.

While CC users/UEs in each cell can use the entire CC band; the CE band is shared among all cells 1-7 in the configured cluster as shown in FIG. 2. If there are $R_{CE}$ resource blocks for CE use only, then each cell is allocated with $R_{cellx}$ RBs for CE users, where $R_{cellx}$ is the number of CE RBs within cell x.

Initial Allocation of Number of Cell-Edge Resource Blocks for Each Cell

In a second step of the method of radio resource allocation in a cluster by using dynamic ICI avoidance strategy, the cell coordination scheduler 527 of VCP 3 makes an initial allocation of CE RBs to each cell in the cluster based on at least one number associated with the CE UEs in each cell. Two algorithms A1, A2 for allocating RBs to CE users in each cell in the cluster are explained below.

Algorithm A1 is User based allocation algorithm: Based on the number of CE users in each cell, cells with more CE users will be allocated by the cell coordination scheduler 527 of the VCP 3 with a higher proportion of CE RBs. For example, the allocating of RBs to CE users can be determined according to the Equation (2) below.

$$R_{cellx} = \frac{U_{cellx}}{\Sigma U_{cellx}} \times R_{CE} \qquad \text{Equation (2)}$$

In the Equation (2), $R_{cellx}$ is the number of CE RBs within cell x; $U_{cellx}$ is the number of CE users that cell x can serve at present instant; $\Sigma U_{cellx}$ is the total number of CE users in all cells within the cluster; and $R_{CE}$ is the number of CE RBs (or the total number of RBs which can be allocated to CE users). In the algorithm A1, the at least one number associated with the CE UEs in each cell of the cluster includes the number of CE UEs in each cell of the cluster, i.e. $U_{cellx}$.

Algorithm A2 is Quality of Service (QoS) based allocation algorithm: in this algorithm, QoS is considered in allocating radio resource to CE UEs. Each cell in the same cluster has a weight ($W_{cellx}$) that is dependent on the number of CE users with real-time (RT) services. The weight, $W_{cellx}$, can be defined as following Equation (3).

$$W_{cellx} = N_{NRT} + \alpha \times N_{RT}(\alpha > 1) \qquad \text{Equation (3)}$$

In the Equation (3), $N_{NRT}$ refers to the number of non-real time CE users/UEs, $N_{RT}$ refers to the number of real time CE users/UEs. Here, the non-real time CE users/UEs refer to the CE users/UEs that use non-real time applications such as web browsing, email, file transfer; the real time CE users/UEs refer to the CE users/UEs that use real time applications such as voice communication, video communication, video streaming and so forth. Also, in the Equation (3), the ratio of CE RBs for all cells is proportional with the ratio of the weights as defined in following Equation (4).

$$R_{cellx} = \frac{W_{cellx}}{\Sigma W_{cellx}} \times R_{CE} \qquad \text{Equation (4)}$$

In the Equations (3), (4), $W_{cellx}$ is the weight of cell x, and $\Sigma W_{cellx}$ is the sum of weight of all cells in the configured cluster. In the algorithm A2, each cell can be allocated with a number of CE RBs, $R_{cellx}$, from $R_{CE}$ RBs such that the total sum of $R_{cellx}$ is equal to $R_{CE}$ according to the following Equation (5).

$$R_{CE} = \Sigma_{x=1}^{C} R_{cellx} \qquad \text{Equation (5)}$$

In the algorithm A2, the at least one number associated with the CE UEs in each cell of the cluster includes the number of real time CE UEs in each cell of the cluster, and the number of non-real time CE UEs in each cell of the cluster, i.e. $N_{RT}$ and $N_{NRT}$.

Configure Initial Location (or Exact Allocation) of CE Resource Blocks to Each Cell The second step described above determines the number of CE RB for each cell. Subsequently, a third step continues to determine the "initial position of CE RBs for each cell in the same cluster". In particular, the third step needs to determine the initial position of CE RB for each cell within the CE frequency bands. There are two simple algorithms B1, B2 proposed to allocate RBs to CE users below.

Figure 7:
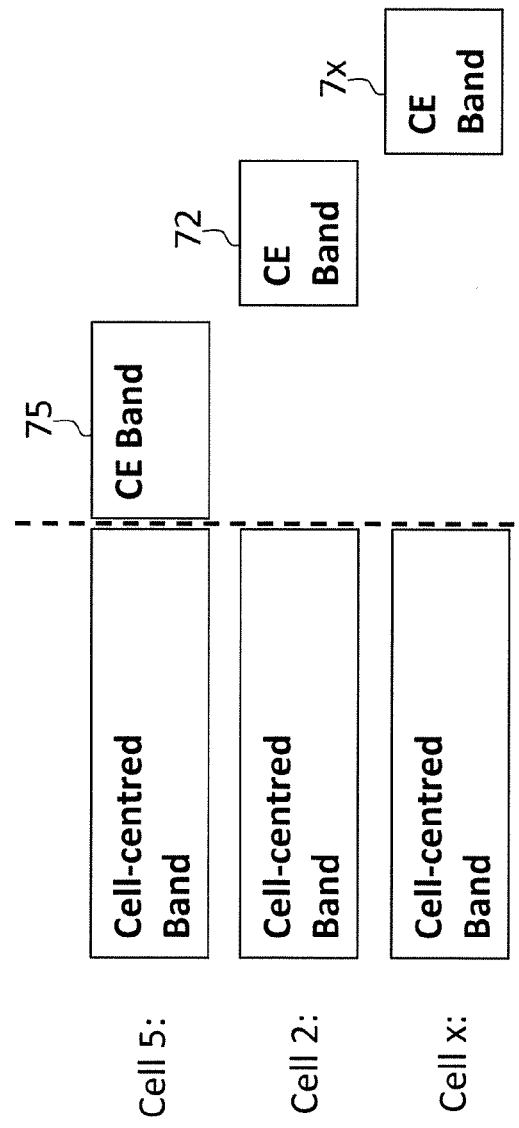
FIG. 7 is a schematic diagram illustrating resource allocation to Cell Edge (CE) users and Cell Centred (CC) users in cells of the same cluster according to one embodiment of the invention.

Algorithm B1 is that cells in the configured cluster are sorted by the number of CE RBs allocated to the cell after the second step. Cells with the greatest number of CE RBs are placed first in the allocation priority. For example, if Cell 5 shown in FIG. 2 had been allocated with 14 CE RBs in the second step and the Cell 5 has the greatest number of CE RBs followed by Cell 2 with 11 RBs, etc. In this example, the first set of 14 CE RBs had been allocated to Cell 5 and the next 5 CE RBs can be allocated to Cell 2 and so forth as shown in FIG. 7. FIG. 7 is a schematic diagram illustrating resource allocation to CE users and CC users in cells of the same cluster according to one embodiment of the invention. As shown in FIG. 7, CC users in Cells 5, 2, x all use the same CC bands. On the other hand, Cell 5 is allocated with CE band 75 (which has the first set of 14 RBs); Cell 2 is allocated with CE band 72 (which has next 5 RBs); the following Cell x is allocated with CE band 7x in the present allocation round.

Algorithm B2: As in Algorithm B1, cells are sorted by the number of CE RBs allocated to the cell after the second step. Cells assigned with the greatest number of CE RBs are placed first in the allocation priority. For the highest allocation priority cell (e.g., Cell 5), this algorithm B2 allocates the best $R_{cellx}$ RBs (e.g., best 15) based on the feedback reported by CE users/UEs in that cell. This procedure is repeated until all CE RBs in the cluster are allocated. In algorithm B2, the best $R_{cellx}$ RBs may be determined by the cell coordination scheduler 527 according to received pilot signal strength reported by CE users/UEs in each cell. Algorithm B2 allocation may result in a non-continuous allocation of RBs for CE users/UEs within a cell.

Improved/Additional Allocation of CE Resource Blocks to Each Cell in the Same Cluster A fourth step in the method of allocating resource in the cluster by using ICI avoidance strategy further improves upon the resource allocation results in the second and third steps by using interference information. In the second and third steps, the division and allocation of CE RBs for CE users does not create any interference on downlink transmission to users/UEs in all cells within the same cluster because CE users are separated (orthogonal) in frequency domain.

However, a RB that is used by a cell may not have interference or have minimal interference with other cells. For example in FIG. 2, RBs used by CE user in Cell 2, may be used by another CE user in Cell 4, 5, or 6 since the distance between Cell 2 and Cell 4, 5, 6 is sufficiently large. Therefore, it is possible to reuse the non-interfering RB in CE bands so as to obtain more efficient utilization of radio resources.

In order to reuse the non-interfering RB in CE bands, in the fourth step, the cell coordination scheduler 527 of VCP 3 maintains a "list of neighbouring and interfering cells" for each cell in the configured cluster. For example, the cell coordination scheduler 527 knows that Cells 3, 1, 7 are neighbouring cells of Cell 2 according to the cluster pattern pre-configured by the VCP 3. This fourth step is similar to "dynamic Inter-cell coordination". The "list of neighbouring and interfering cells" can be either pre-configured by an operator or the cell coordination scheduler 527 can dynamically generate the "list of neighbouring and interfering cells" for each cell in the cluster based on received pilot signal strength reported by UE(s) in each cell.

Since the first cell in the above cell loop iteration will have a higher possibility of obtaining additional RBs, the order of iteration through the cells in the cell loop can be either (a) randomly selected; (b) selected by round-robin or (c) configured by another algorithm to improve the fairness of resource allocation. By performing the above two loops in the fourth step, additional RBs are allocated to CE users such that ICI within the cluster is minimized and following inequality condition of mathematical Expression (6) is also satisfied.

$$R_{CE} < \Sigma_{x=1}^{C} R_{cellx} \quad \text{Expression (6)}$$

Figure 8:
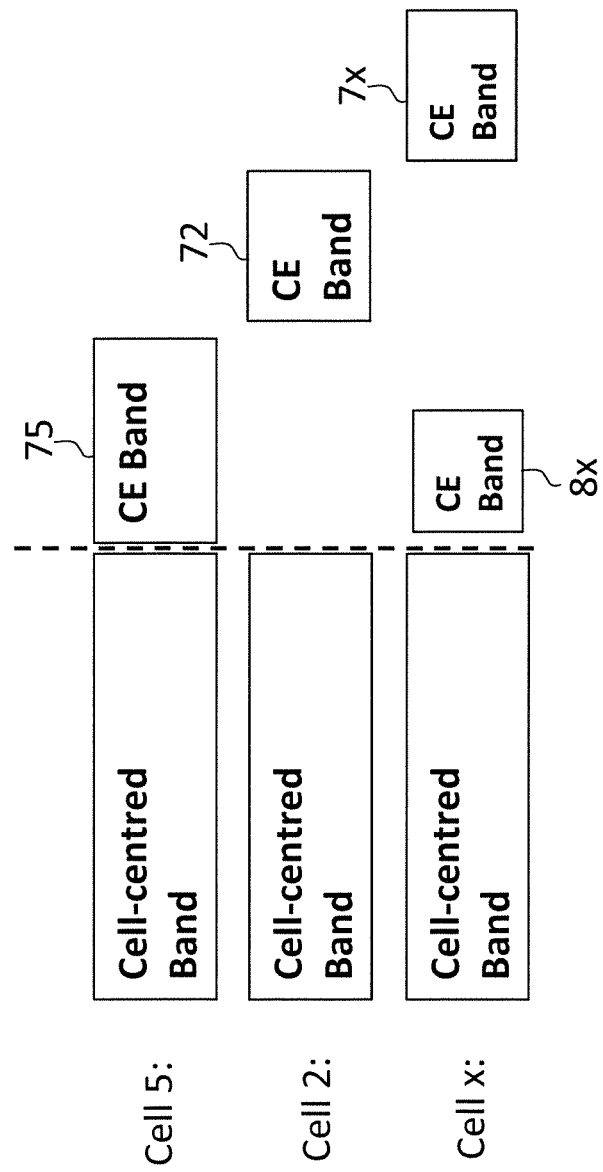
FIG. 8 is a schematic diagram illustrating resource allocation to CE users and CC users in cells of the same cluster with extra RBs being allocated to one cell based on non-interference between the cell and another cell in the cluster according to one embodiment of the invention.

FIG. 8 is a schematic diagram illustrating resource allocation to CE users and CC users in cells of the same cluster with extra RBs being allocated to Cell x based on non-interference between Cell x and Cell 5 in the cluster according to one embodiment of the invention. As shown in FIG. 8, previously in the third step, CE bands 75, 72, 7x had been allocated respectively to CE user(s) in Cells 5, 2, x. After performing the fourth step, additional CE band 8x can be allocated to Cell x since Cell x is not in the "list of neighbouring and interfering cells" of Cell 5.

Intra-Cell Resource Allocation

In the previously mentioned first, second, third and fourth steps, the cell coordination scheduler 527 has determined the number of CE RBs and position of CE RBs that will be allocated to each cell in the cluster under its control. In the fifth step in the method of allocating radio resource in the cluster by using ICI avoidance strategy, the cell coordination scheduler 527 will allocate RBs to each user within each cell. In the CC band, the cell coordination scheduler 527 can allocate all CC RBs in each cell to its users. In the CE band, the cell coordination scheduler 527 can allocate the CE RBs determined by the second, third and fourth steps to CE users/UEs within that cell. For example, the following packet scheduling algorithms can be used for this fifth step (which performs the intra-cell resource allocation): Max-rate (MR), Proportional Fair (PF), Modified-Largest Weighted Delay First (M-LWDF) Algorithm, Exponential Rule Algorithm (EXP), Quality-Driven Scheduling (Q-DS) Algorithm, Robust and QoS-Driven Scheduling (RQ-DS).

For explanation, PF algorithm can be modified as an Algorithm C1 for allocating radio resource to CC and CE users in each cell according to following Equations (7), (8), (9), (10), (11):

$$\text{for CC, CE: } \mu_{i,j}(t) = \frac{r_{i,j}(t)}{R_i(t)} \quad \text{Equation (7)}$$

$$\text{for CC, CE: } R_i(t) = \left(1 - \frac{1}{t_c}\right) \times R_i(t-1) + \frac{1}{t_c} \times rtot_i(t) \quad \text{Equation (8)}$$

$$\text{for CC: } rtot_i(t) = \sum_{j=1}^{RB_{CC}} I_{i,j}(t) \times r_{i,j}(t) \quad \text{Equation (9)}$$

$$\text{for CE: } rtot_i(t) = \sum_{j=1}^{RB_{CE}} I_{i,j}(t) \times r_{i,j}(t) \quad \text{Equation (10)}$$

$$I_{i,j}(t) = \begin{cases} 1 & \text{if packets of user } i \text{ are scheduled on } RB\ j \text{ at } TTI\ "t" \\ 0 & \text{if packets of user } i \text{ are not scheduled on } RB\ j \text{ at } TTI\ "t" \end{cases} \quad \text{Equation (11)}$$

In the Equations (7)-(11) shown above, the parameter i refers to user i; the parameter j refers to the $j^{th}$ RB, $\mu_{i,j}(t)$ is the priority of user i on RB j at time t; $r_{i,j}(t)$ is the instantaneous data rate of user i on RB j at time t; $R_i(t)$ is the average throughput of user i at time t; $t_c$ is a time constant; $rtot_i(t+1)$ is the total data rate being used to transmit packets to user i at time t+1; $I_{i,j}(t+1)$ is the indicator function of the event that packets of user i are selected for transmission on RB j at time t+1; $RB_{CC}$ is the maximum available number of RBs for CC users; and $RB_{CE}$ is the maximum available number of RBs for CE users.

In addition to the aforementioned PF algorithm for the fifth step on allocating radio resource to CC and CE users in each cell in the cluster by the cell coordination scheduler 527, there is proposed another Algorithm C2 for wireless communication system conforming 3GPP LTE- Advanced standard. The Algorithm C2 is an additional algorithm that is better suited for the wireless communication system when there are multiple component carriers or carrier aggregation is supported in the system.

Continuing from the first, second, third and fourth steps, in the fifth step, each cell will use the Algorithm C2. The Algorithm C2 is a packet scheduling algorithm similar to Optimized Cross-Component Carrier M-LWDF algorithm, which can be used by the cell coordination scheduler 527 to allocate RBs of each cell to all users in the cells. This Algorithm C2 can support RT and non-RT services as well as support 3GPP LTE-Advanced system or wireless communication system with multiple component carriers.

In the invention, the VCP 3 is used as a centralized scheduler in the Algorithm C2, and the cell coordination scheduler 527 can control the whole bandwidth of all component carriers and compute the metrics of all users in each cell in the configured cluster using the mathematical Equation (12), (13), (14) below and then make the decision for packet scheduling/resource allocation.

$$M_{k,i,j} = a_i W_i \frac{r_{k,i,j}(t)}{\frac{R_i(t)}{N_i}} \quad \text{Equation (12)}$$

$$a_i = -\frac{(\log \delta_i)}{\tau_i} \quad \text{Equation (13)}$$

In Equations (12)-(13), $W_i(t)$ is the Head of Line (HOL) packet delay of user i at time t, $\tau_i$ is the delay threshold of user i (before the first HOL packet of user i is transmitted in downlink), $\delta_i$ denotes the maximum probability for HOL packet delay of user i to exceed the delay threshold of user i; $N_i$ is the number of CCs on which packet can be transmitted to the user i in downlink; $r_{k,i,j}(t)$ is the instantaneous achievable data rate of user i on the kth component carrier at the jth RB; $R_j$ is total average data rate of user i in all CCs as defined in following $$R_i(t) = \left(1 - \frac{1}{t_c}\right) \times R_i(t-1) + \frac{1}{t_c} \times r_i(t-1) \quad \text{Equation (14)}$$

In Equation (14), $r_i(t)$ is the total instantaneous data rate in all assigned RBs in all CCs of the user i in previous time slot that had been transmitted. Also, $\alpha_i$ in the expression (13) may represent urgency of a packet transmission to the user i related to QoS. The delay threshold, $\tau_i$, may represent how much more time the packet for the user i has to wait before transmission in downlink.

When the Algorithm C2 is applied in a wireless communication system without multiple component carriers such as in 3GPP LTE system, then the parameter "k" in previous Equations (12)-(14) can be omitted.

In order to meet stringent QoS requirements of some traffic types, for example, Voice over Internet Protocol (VoIP) packets and packets for re-transmission due to Hybrid automatic repeat request (HARQ) can be assigned with higher priority in the fifth step's intra-cell resource allocation. For example, in order to meet time sensitive requirement of VoIP, a pre-configured percentage of CC RBs can be allocated to CC users using VoIP only. On the other hand, for VoIP users located in CE region of each cell, the VoIP packets can be allocated with RBs before other traffic types of other users in CE area of that cell.

In a large scale implementation, wherein the number of cells controlled by the VCP 3 is large, the number of cells can be divided into several clusters as needed for ICI Coordination. When there are multiple clusters in the wireless communication system, each cluster can share information with other clusters to avoid ICI. The concept of a solution for multi-cluster ICI is explained below.

Apart from the VCP 3 maintaining the "list of neighbouring and interfering cells" for each cell in the configured cluster, the cell coordination scheduler 527 can also maintain a "list of neighbouring cells of nearby clusters" for each cluster in the wireless communication system. For example, in a Cluster A, Cell 3 and 4 are neighbors of Cluster B; Cells 4, 5, 6 are neighbors with Cluster C. After RB allocation process is performed according to the first to fifth steps, the information about CE RBs allocations for Cell 3 and 4 will be sent to the cluster scheduler/cell coordination scheduler 527 responsible for resource allocation in Cluster B.

According to the cluster priority (or the cell priority), RB allocations in a cluster with lower priority can be compared with cells of the neighboring cluster. When there is a conflict on RB allocation, then the cell coordination scheduler 527 can determine that the cluster with lower priority withdraws the allocation of the conflicted CE RB. For example, Cluster A has higher priority than Cluster B. When the Cluster B has Cells 6 and 7 neighboring with Cluster A, and if a same RB was assigned in these two cells, the allocation of the RB in the Cluster B will be withheld. As a result, the interference around the border of clusters is avoided.

Three-Sector Simulation of the Proposed Method

Figure 9:
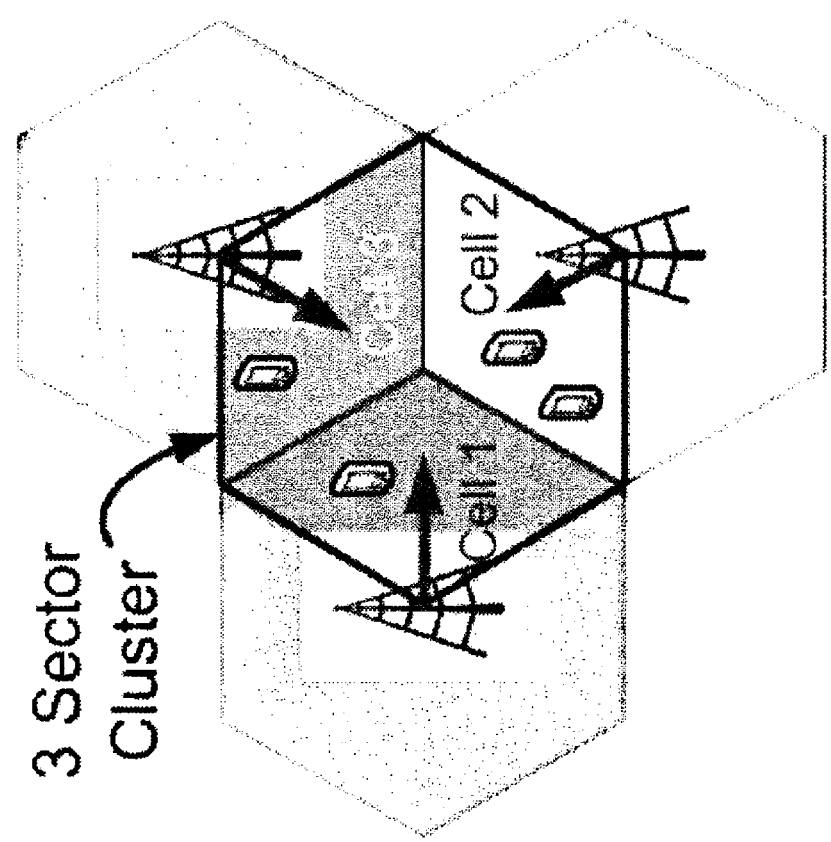
FIG. 9 is a schematic diagram illustrating network layout of a 3-sector cluster according to one embodiment of the invention.

FIG. 9 shows a schematic diagram illustrating network layout of a 3-sector cluster according to one embodiment of the invention. A simulation of the proposed method of resource allocation is conducted based on the 3-sector cluster shown in FIG. 9. The basic simulation parameters are shown below in Table I below. Apart from the basic simulation parameters, there are other assumption in the simulations such as: each UE reports its channel quality indicator (CQI) feedback for each RB in each TTI, no delay in CQI report, UEs will be categorized into groups of CE users and CC users in each TTI (since location of UEs may be dynamically changed, categorization of UEs per TTI may be reasonable). Additionally, the total cluster throughput is defined as the total amount of bits successfully received by all UEs in the cluster, and the average throughput of CE UEs is defined as the $5^{th}$ percentile in the UE throughput distribution of each cell in the cluster.

TABLE I

Simulation Parameters for 3-Sector Network Layout

| Parameter | Value |
| --- | --- |
| Number of sectors | 3 (Three sector cluster) |
| Cell radius | 500 m |
| Bandwidth | 10 MHz |
| Tx power | 46 dBm |
| Transmission mode | SISO |
| Frame Structure | FDD |
| HARQ | OFF |
| Number of UEs per Cell | 100 |
| UE Mobility model | Random Direction TSC |
| UE speed | 3 km/h |
| Handover | OFF |
| Application | Video 128 Kbps |
| Max Delay (QoS parameter for VIDEO) | 0.3 s |
| Scheduler | MLWDF |
| Simulation duration | 100 s |

The following Table II illustrates the performance gain through C-RAN applying the centralised resource allocation in the 3-sector (of the configured cluster) by ICI avoidance strategy. The simulation environment consist of three cells with base station at respective sites and the 3-sector refers to the region where 3 sectors from Cell 1, Cell 2 and Cell 3 are neighbouring/next to each other respectively. The parameter a in Table IV refers to the predetermined threshold amount delta Δ between CC users and CE users. From the simulation, it clearly indicates that CE UE throughput improvement from C-RAN or centralized allocation of CE RBs to CE UEs in the cluster. The simulation indicates that as threshold amount delta Δ increases (the CE region in each cell is also increased), CE UE throughput improvement and total throughput improvement are increased as compared to no C-RAN. Since this simulation only involves with 3 sectors (in the cluster), different number of UEs such as 20 UEs, 60 UEs and 100 UEs are simulated in the pre-configured environment and the corresponding test results are shown in Table II.

RB in each TTI, no delay in CQI report, UEs will be categorized into groups of CE users and CC users in each TTI (since location of UEs may be dynamically changed, categorization of UEs per TTI may be reasonable), and no inter-cluster interference. Additionally, the total cluster throughput is defined as the total amount of bits successfully received by all UEs in the cluster, and the average throughput of CE UEs is defined as the $5^{th}$ percentile in the UE throughput distribution of each cell in the cluster.

The following Table III illustrates the performance gain through C-RAN applying the centralised resource allocation in the 9-sector (in the cluster of three cells) by ICI avoidance strategy. The simulation environment consist of three cells with base station at respective sites and the 9-sector refers to the region with total 9 neighbouring sectors respectively from Cell 1, Cell 2 and Cell 3. The parameter a in Table III refers to the predetermined threshold amount delta Δ

TABLE II

Simulation Results for 3-Sector Network Layout

| | | Cell1 CE UE Throughput (Bytes) | Cell2 CE UE Throughput (Bytes) | Cell3 CE UE Throughput (Bytes) | CE UE Throughput Improvement compared to the scenario without C-RAN | Total Cluster Throughput (Bytes) | Total Throughput Improvement compared to the scenario without C-RAN |
|---|---|---|---|---|---|---|---|
| No C-RAN | UEs: 20 | 1964951.8 | 1982883.1 | 1882255 | — | 153067081.1 | — |
| | UEs: 60 | 2570423.1 | 2492711.7 | 2567480 | — | 54683641.1 | — |
| | UEs: 100 | 2930112.8 | 2872566.2 | 2978795.2 | — | 984691591.2 | — |
| SINR Threshold, $\alpha = 1$ | UEs: 20 | 2283593.9 | 2317804.7 | 2240847.2 | 17.39% | 171270596.8 | 11.89% |
| | UEs: 60 | 2839510.6 | 2799314.8 | 2808582.8 | 10.72% | 573359123.6 | 4.85% |
| | UEs: 100 | 2942036 | 2915565.4 | 2984999.8 | 0.7% | 980616390.8 | −0.41% |
| SINR Threshold, $\alpha = 5$ | UEs: 20 | 2497333.6 | 2548216.9 | 2494180.6 | 29.37% | 176638757.7 | 15.40% |
| | UEs: 60 | 2897321.8 | 2855825.5 | 2803777.6 | 12.16% | 584547735.5 | 6.90% |
| | UEs: 100 | 3038056.6 | 3007856.4 | 3037245.6 | 3.45% | 988457147.6 | 0.38% |
| SINR Threshold, $\alpha = 10$ | UEs: 20 | 2843695.2 | 2850474.9 | 2752033.1 | 44.89% | 186817280.1 | 22.05% |
| | UEs: 60 | 2903172.5 | 2909303.6 | 2815412.3 | 13.1% | 610889650.6 | 11.71% |

Nine-Sector Simulation of the Proposed Method

Figure 10:
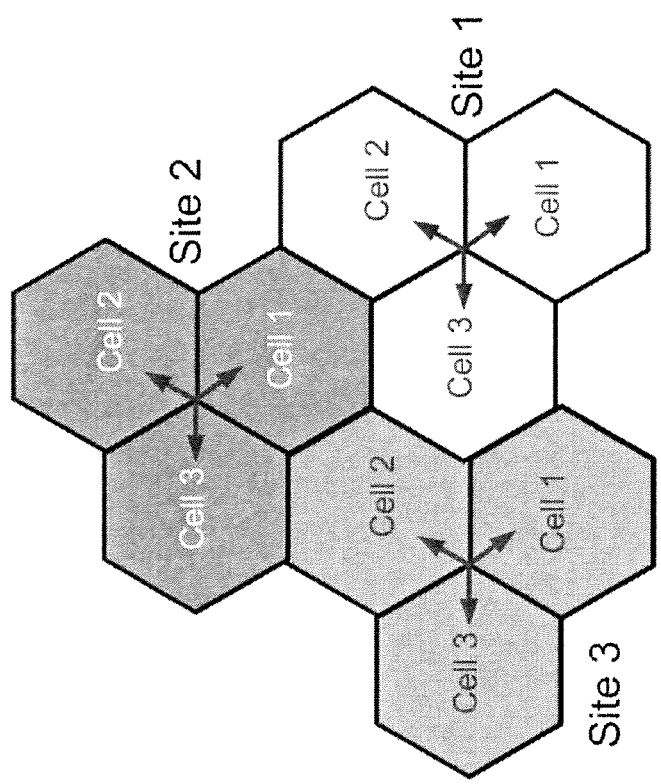
FIG. 10 is a schematic diagram illustrating network layout of a 9-sector cluster according to one embodiment of the invention.

FIG. 10 is a schematic diagram illustrating network layout of a 9-sector cluster according to one embodiment of the invention. A simulation of the proposed method of resource allocation was conducted based on the 9-sector cluster shown in FIG. 9. The basic simulation parameters are similar to those shown in Table I except now there are 9 sectors in the configured cluster of 3 cells at cell sites 1, 2, 3 respectively. Apart from the basic simulation parameters, there are other assumptions in the simulations such as: each UE reports its channel quality indicator (CQI) feedback for each between CC users and CE users. From the simulation, it clearly indicates that CE UE throughput improvement from C-RAN or centralized allocation of CE RBs to CE UEs in the cluster. The simulation indicates that as threshold amount delta Δ increases (the CE region in each cell is also increased), CE UE throughput improvement and total throughput improvement are increased as compared to no C-RAN. The simulation of 9-sector in the configured cluster is performed only with a number of 20 UEs in the pre-configured environment and the corresponding test results are shown in Table III.

TABLE III

Simulation Results for 9-Sector Network Layout

| | | Cell1 CE UE Throughput (Bytes) (Per Sector) | Cell2 CE UE Throughput (Bytes) (Per Sector) | Cell3 CE UE Throughput (Bytes) (Per Sector) | CE UE Throughput Improvement compared to the scenario Without C-RAN (Per Sector) | Total Cluster Throughput (Bytes) | Total Throughput Improvement compared to the scenario Without C-RAN |
|---|---|---|---|---|---|---|---|
| No C-RAN | UEs: 20 | 1995546.2 | 2145327.2 | 2047003.0 | — | 559640806.1 | — |
| SINR Threshold, $\alpha = 1$ | UEs: 20 | 2247650.4 | 2292417.8 | 2116838.6 | 4.11% | 559610359.6 | 0.48% |
| SINR Threshold, $\alpha = 5$ | UEs: 20 | 2516217.0 | 2591463.2 | 2469731.0 | 4.68% | 569747747.4 | 2.30% |

TABLE III-continued

Simulation Results for 9-Sector Network Layout

|  | | Cell1 CE UE Throughput (Bytes) (Per Sector) | Cell2 CE UE Throughput (Bytes) (Per Sector) | Cell3 CE UE Throughput (Bytes) (Per Sector) | CE UE Throughput Improvement compared to the scenario Without C-RAN (Per Sector) | Total Cluster Throughput (Bytes) | Total Throughput Improvement compared to the scenario Without C-RAN |
|---|---|---|---|---|---|---|---|
| SINR Threshold, $\alpha = 10$ | UEs: 20 | 2791317.2 | 3034568.8 | 2836808.4 | 5.91% | 573151513.4 | 2.91% |

Figure 11:
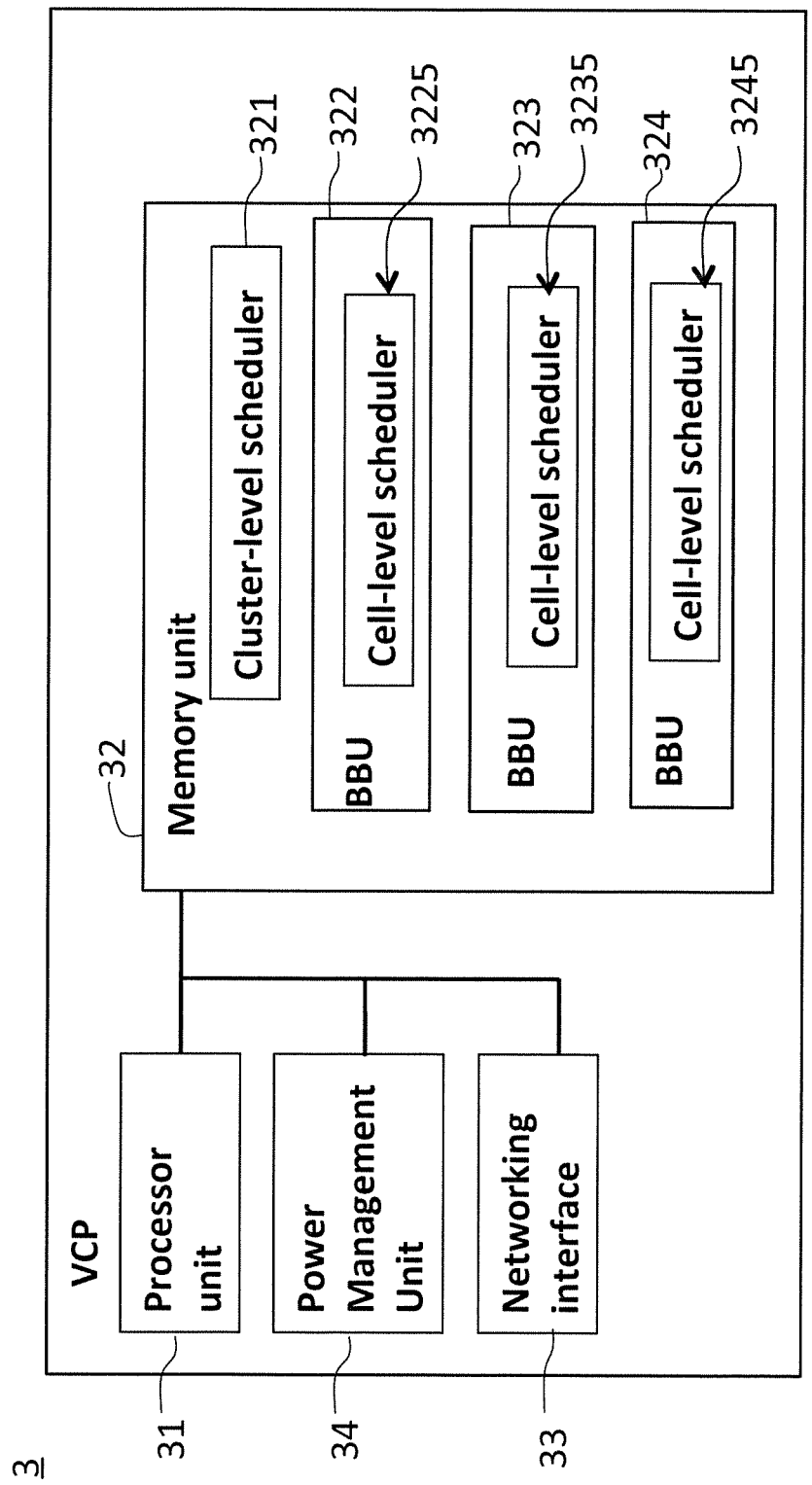
FIG. 11 is a block diagram illustrating the physical components of an exemplary VCP on which the base station server in FIG. 1 is implemented according to one embodiment of the invention.

FIG. 11 is a block diagram illustrating the physical components of an exemplary VCP 3 on which the base station server in FIG. 1 is implemented according to one embodiment of the invention. The VCP 3 shown in FIG. 11 is similar to that shown in FIG. 3 but FIG. 11 illustrates the functional elements in more details regarding the resource allocation operations between the base station server 10 and its base station clients 11. As shown in FIG. 11, the VCP 3 includes a processor unit 31, a power management unit 34, a networking or input/output interface 33, and a memory unit 32. The memory unit 32 includes a cluster-level scheduler 321 and a plurality of cell-level schedulers 3225, 3235, 3245.

The cluster-level scheduler 321 of the VCP 3 can be regarded as a resource allocation controller for its configured cluster in the base station server 10. The cluster-level scheduler 321 can be implemented as the cell coordination scheduler 527 as shown in FIG. 5. The cluster-level scheduler 321 may receive channel quality metrics of all user equipments (UEs) in a cluster of at least two eNodeBs respectively corresponding to the plurality of baseband processors. For instance, in the example shown in FIG. 1, there are 3 eNodeBs such as base station clients 11a, 12a, 13a in the configured cluster. Also, the base station clients 11a, 12a, 13a may be corresponding to BBUs 322, 323, 324 and the cell-level schedulers 3225, 3235, 3245. In particular, the BBUs 322, 323, 324 may firstly receive channel quality metrics (e.g., CQI and RSRP) of all UEs in their respective radio service coverage area, and then report all these channel quality metrics of all UEs in the cluster to the cluster-level scheduler 321.

The cluster-level scheduler 321 of the VCP 3 performs assigning frequency band into CE bands and CC bands, and also allocating CE RBs for each cell in the configured cluster. Then, the cell-level schedulers 3225, 3235, 3245 of the BBUs 322, 323, 324 may performing cell-level packet scheduling for CE UEs and CC UES during a pre-configured interval. Specifically, the cluster-level scheduler 321 may include:

a classifier for classifying each user equipment (UE) in each cell of a cluster to be a cell edge (CE) UE or a cell centred (CC) UE according to pilot signal strength reported by the UE;

a divider for dividing available frequency band into two non-overlapping frequency bands of CE frequency band and CC frequency band based on the number of CC UEs and the number of CE UEs in the cluster;

a resource allocator for assigning non-overlapping portion from the CE frequency band to each cell of the cluster based on at least one number associated with the CE UEs in each cell of the cluster;

assigning at least one resource block (RB) from the CC frequency band to each CC UE in each cell of the cluster; and assigning at least one RB from the assigned non-overlapping portion from the CE frequency band to each cell of the cluster to each CE UE in the corresponding cell.

Figure 12:
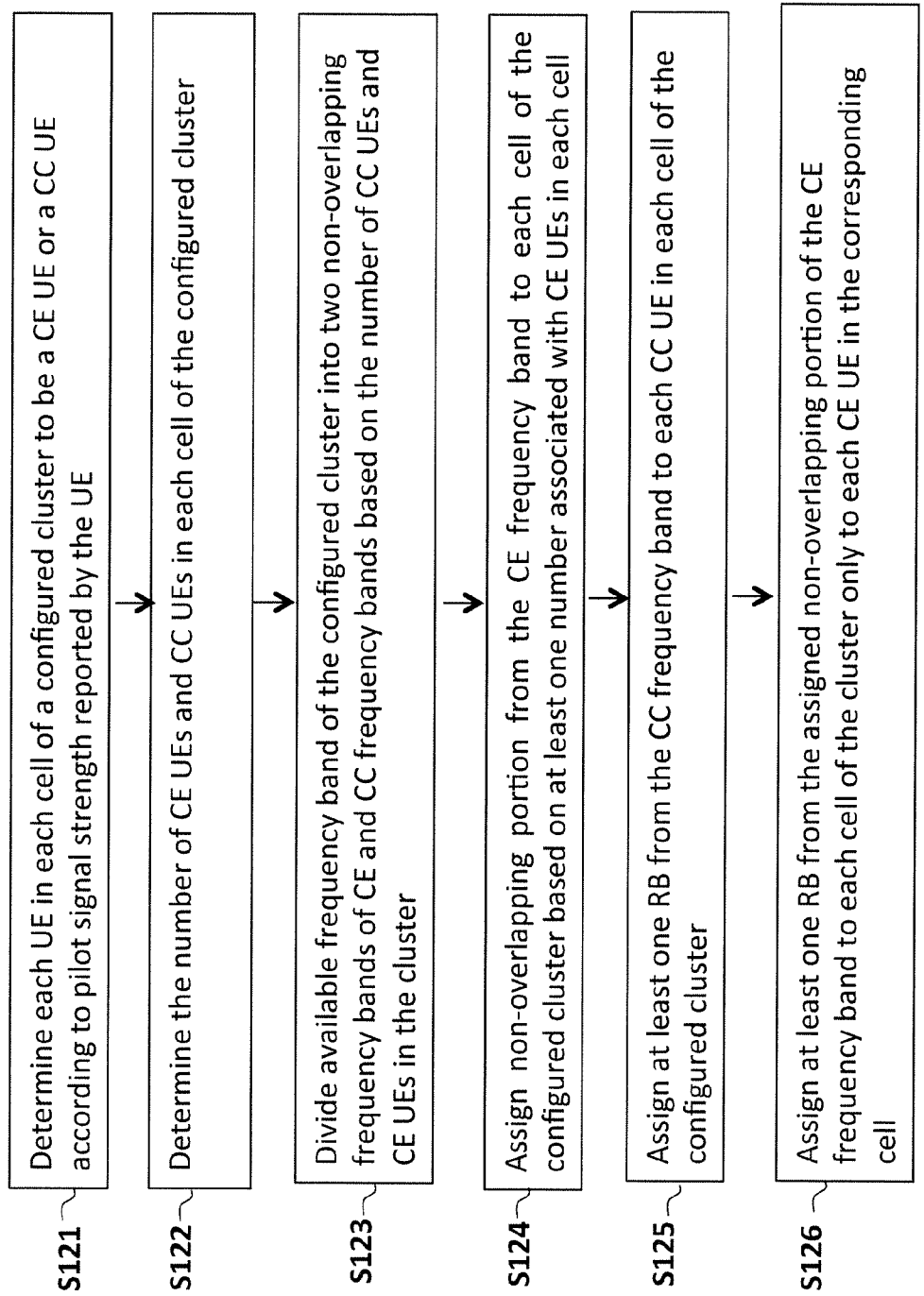
FIG. 12 is a flowchart illustrating a method of resource allocation in a cluster by using ICI avoidance strategy according to one embodiment of the invention.

FIG. 12 is a flowchart illustrating a method of resource allocation in cluster by using ICI avoidance strategy according to one embodiment of the invention. Referring to both FIG. 11 and FIG. 12, the proposed method in the embodiment may include following steps S121-S126. The method presented in FIG. 12 may be performed by the cluster-level scheduler 321 for every pre-configured interval, where the pre-configured interval may be every 10 TTIs, every few minutes or every minute for example.

In step S121, the classifier in the cluster-level scheduler 321 determines each UE in each cell in a configured cluster to be a CE UE or a CC UE according to its reported pilot signal strength.

In step S122, the cluster-level scheduler 321 determines the number of CE UEs and the number of CC UEs in each cell of the configured cluster. This step may be done by the divider in the cluster scheduler 321 or other calculation units in the cluster-level scheduler 321.

In step S123, the divider in the cluster-level scheduler 321 divides total available frequency band of the configured cluster into two non-overlapping frequency bands of CE frequency band and CC frequency band based on the number of CC UEs and the number of CE UEs.

In step S124, the resource allocator in the cluster-level scheduler 321 assigns non-overlapping portion from the CE frequency band to each cell of the configured cluster based on at least one number associated with the CE UEs in each cell.

In step S125, the resource allocator in the cluster-level scheduler 321 assigns at least one RB from the CC frequency band to each CC UE in each cell of the configured cluster.

In step S126, the resource allocator in the cluster-level scheduler 321 assigns at least one RB from the assigned non-overlapping portion of the CE frequency band to each cell of the cluster only to each CE UE in the corresponding cell.

The following paragraphs describe some of the above-described steps or alternative procedures in more details. In the step S121, the classifier in the cluster-level scheduler 321 may determine the UE to be a CC UE, when a pilot signal strength reported by the UE in its serving cell of the configured cluster is greater than pilot signal strength reported by the UE in any other cell of the configured cluster by a predetermined threshold Δ. Otherwise, the classifier in the cluster-level scheduler 321 determines the UE to be CE UE if the pilot signal strength reported by the UE in any cell of the configured cluster is no greater than pilot signal strength of any other cell in the configured cluster by the predetermined threshold Δ. For example, when a UE A reports the received pilot signal strength from its serving cell 1 is greater than received pilot signal strengths from other cells 2-7 by more than the predetermined threshold Δ, then the cluster-level scheduler 321 can determine the UE A to be a CC UE. The predetermined threshold Δ, may be 1 dB, 5 dB or 10 dB for instance.

In the step S123, the divider in the cluster-level scheduler 321 may further calculate a change factor, F, based on the number of CE UEs and CC UEs in the configured cluster according to the mathematical Equation (a) below, and then divide the complete available frequency band into the CC frequency band and the CE frequency bands based on the calculated change factor.

$$F = \frac{N_{CC}}{N_{CE} + N_{CC}}, \quad \text{Equation (a)}$$

where, in the Equation (a), a parameter $N_{CE}$ refers to the number of CE UEs and a parameter $N_{CC}$ refers to the number of CC UEs in the configured cluster.

In the step S124, according to one example of the embodiment of the invention, the resource allocator in the cluster-level scheduler 321 may determine the non-overlapping portion from the CE frequency band to be assigned to each cell by using a user based allocation algorithm, wherein the number of the CE UEs in each cell is used to determine the non-overlapping portion from the CE frequency band to be assigned to each cell. For example, the Algorithm A1 shown in Equation (2).

According to another example of the embodiment of the invention, the resource allocator in the cluster-level scheduler 321 may determine the non-overlapping portion from the CE frequency band to be assigned to each cell by using a QoS based allocation algorithm, wherein the number of CE UEs with real-time services and the number of CE UEs with non-real time services in each cell are used to determine the non-overlapping portion from the CE frequency band to be assigned to each cell. For example, the resource allocator in the cluster-level scheduler 321 is further configured to perform the following procedures:

calculating CE weight, $W_{cellx}$, for each cell in the configured cluster according to following Equation (b):

$$W_{cellx} = N_{NRT} + \alpha \times N_{RT} (\alpha > 1) \quad \text{Equation (b),}$$

where, in the Equation (b), $W_{cellx}$ is the CE weight of cell x, $N_{NRT}$ refers to the number of non-real time CE users/UEs in the cell x, $N_{RT}$ refers to the number of real time CE users/UEs in the cell x; and calculating the ratio of CE RBs for all cells based on the ratio of the calculated CE weights, $W_{cellx}$, according to following Equation (c):

$$R_{cellx} = \frac{W_{cellx}}{\Sigma W_{cellx}} \times R_{CE}, \quad \text{Equation (c)}$$

where, in the Equation (c), $\Sigma W_{cellx}$ is the sum of CE weight of all cells in the configured cluster, $R_{cellx}$ refers to the number of CE RBs assigned to the cell x, and the parameter $R_{CE}$ is subject to following Equation (d):

$$R_{CE} = \Sigma_{x=1}^{C} R_{cellx} \quad \text{Equation (d),}$$

where parameter C in the Equation (d) refers to the total number of cells with any CE UE during the present configured interval, and parameter $R_{CE}$ is the number of CE RBs in the configured cluster.

In the step S124, the resource allocator in the cluster-level scheduler 321 may further perform the following procedures:

sorting cells of the configured cluster by the number of CE RBs in the cells respectively;

assigning allocation priority respectively to the cells of the configured cluster according to number of CE RBs in the cells; and for all cells, respectively determining an initial location of the RBs in the CE frequency band according to the assigned allocation priority, where a cell H assigned with the highest number of RBs in the CE frequency band is allocated with the first RB in the CE frequency band. For example, the higher allocation priority should be assigned by the cluster-level scheduler 321 to the cell previously assigned with the greater number of CE RBs. As such, the cell with highest allocation priority will be allocated with the first RB or the first few RBs in the whole CE frequency band by the cluster-level scheduler 32.

In another embodiment of the invention, in the step S124, the resource allocator in the cluster-level scheduler 321 may further perform the following procedures:

sorting cells of the configured cluster by the number of CE RBs assigned in the cell;

assigning allocation priority respectively to the cells of the configured cluster according to number of CE RBs in the cells; and starting from a cell H assigned with highest allocation priority, assigning the best $R_{cellH}$ RBs based on the received pilot signal strength reported by CE UEs in the cell H until all CE RBs are allocated for the current configured interval, where the $R_{cellH}$ refers to the number of CE RBs assigned to the cell H. To be illustrated more clearly, if there are still other CE RBs in the CE frequency band not allocated to any CE UEs, then the cluster-level scheduler 321 may continue to allocate CE RBs to the CE UEs in the cell with next level of allocation priority based on the received pilot signal strength reported by CE UEs in the cell. This step continues until all CE RBs in the CE frequency band are all allocated to CE UEs in the configured cluster for the present interval.

In another embodiment of the invention, after the step S124, the resource allocator in the cluster-level scheduler 321 may be configured to further perform the following procedures:

generating a list of neighbouring and interfering cells for each cell of the configured cluster; and for each cell, re-allocating to at least one CE UE in the cell with at least one RB from the $RB_{CE\_cellx}$ of the cell x which is not in the cell's list of neighbouring and interfering cells, where $RB_{CE\_cellx}$ refers to the CE RBs previously assigned to the cell x. For example, in this embodiment, the cluster-level scheduler 321 searches through the "list of neighbouring and interfering cells" for the cell k, and finds the cell x is not in the "list of neighbouring and interfering cells" for the cell k. Then, the cluster-level scheduler 321 can allocate the one or more RB(s) from the $RB_{CE\_cellx}$ of the cell x to the one or more CE UE(s), which is not allocated with any CE RB during the present interval, in the cell x.

In the step S126, the cell-level schedulers may be further configured to assign a portion of RBs from the CE frequency band to CE users in a cell x according to the mathematical Equation (e):

$$R_{cellx} = \frac{U_{cellx}}{\Sigma U_{cellx}} \times R_{CE}, \quad \text{Equation (e)}$$

where, in the Equation (e), a parameter $R_{cellx}$ is the number of CE RBs within the cell x; a parameter $U_{cellx}$ is the number of CE users that the cell x can serve at present instant; $\Sigma U_{cellx}$ is the total number of CE users in all cells within the configured cluster; and a parameter $R_{CE}$ is the number of CE RBs in the configured cluster.

By executing the methods for packet scheduling/resource allocation as described in preceding exemplary embodiments for the C-RAN of the LTE network, the inter-cell interference in each cluster may be reduced drastically compared to the situation without application of any of the methods for packet scheduling/resource allocation in the LTE network.

The preceding exemplary embodiments of the present invention may be implemented in software/instruction codes/application logic/instruction set/computer program codes (executed by one or more processors), may be fully implemented in hardware, or implemented in a combination of software and hardware. For instance, the software (e.g., application logic, an instruction set) is maintained on any one of various conventional computer-readable media. In the present disclosure, a "computer-readable medium" may be any storage media or means that can carry, store, communicate, propagate or transport the instructions for use by or in connection with an instruction execution system, apparatus, or device, such as a communication device, a virtual cloud platform apparatus 3 shown in FIGS. 3 and 11. A computer-readable medium may include a computer-readable storage medium (e.g., a physical device) that may be any media or means that can carry or store the instructions for use by or in connection with a system, apparatus, or device, such as a computer or a communication device. For instance, the memory unit 32 may include the computer-readable medium which may include computer program code, when executed by the processor unit 31, may cause the cluster-level scheduler and the cell-level schedulers of BBUs in the virtual cloud platform apparatus 3 to perform procedures/steps illustrated in FIGS. 5 and 11-12.

Embodiments of the method of the invention provide useful solutions to enable minimizing inter-cell interference through method of packet scheduling/resource allocation in cluster by using ICI avoidance strategy in the cluster of a plurality of cells with the application of the C-RAN system architecture.

The aforementioned embodiments have been described by way of example only and modifications are possible within the scope of the claims that follow.

The invention claimed is:

1. A method for resource allocation in a wireless communication network, comprising:
   determining, at a base station server, each user equipment (UE) in each cell of a cluster to be a cell edge (CE) UE or a cell centred (CC) UE, according to pilot signal strength reported by the UE;
   dividing, at the base station server, an available frequency band into two non-overlapping frequency bands based on the number of CC UEs and the number of CE UEs in the cluster, wherein the two non-overlapping frequency bands include a CE frequency band which is for the CE UEs in the cluster and a CC frequency band which is for the CC UEs in the cluster;
   assigning, at the base station server, a non-overlapping portion from the CE frequency band to the CE UEs in each cell of the cluster based on at least one number of the UEs associated with the CE UEs in each cell of the cluster;
   assigning, at the base station server, at least one resource block (RB) from the CC frequency band to each CC UE in each cell of the cluster; and
   assigning, at the base station server, at least one RB from the non-overlapping portion assigned to the CE UEs in each cell of the cluster, to each CE UE in each cell of the cluster;
   wherein said dividing includes calculating, at the base station server, a change factor F; and dividing the available frequency band into the CC frequency band and the CE frequency band based on the calculated change factor F,
   wherein the change factor F is calculated according to the following Equation:

$$F = \frac{N_{CC}}{N_{CE} + N_{CC}}$$

wherein $N_{CE}$ refers to the number of CE UEs in the cluster and $N_{CC}$ refers to the number of CC UEs in the cluster.

2. The method as claimed in claim 1, wherein the step of determining each UE in each cell of the cluster to be a CE UE or a CC UE according to the pilot signal strength reported by the UE, further comprises:
   determining the UE to be a CC UE by the base station server if the pilot signal strength reported by the UE in its serving cell of the cluster is greater than pilot signal strength reported by the UE in any other cell of the cluster by a predetermined threshold; and
   determining the UE to be a CE UE by the base station server if the pilot signal strength reported by the UE in any cell of the cluster is not greater than the pilot signal strength reported by the UE in any other cell in the cluster by the predetermined threshold.

3. The method as claimed in claim 1, wherein the step of assigning the non-overlapping portion from the CE frequency band to the CE UEs in each cell of the cluster based on at least one number of the UEs associated with the CE UEs in each cell, further comprises:
   calculating the number of CE RBs in the CE frequency band to be assigned to CE UEs in a cell of the cluster according to the following Equation:

$$R_{cellx} = \frac{U_{cellx}}{\Sigma U_{cellx}} \times R_{CE}$$

wherein $R_{cellx}$ is the number of CE RBs within the cell x; $U_{cellx}$ is the number of CE UEs that the cell x can serve at present instant; $\Sigma U_{cellx}$ is the total number of CE UEs in all cells within the cluster; and $R_{CE}$ is the number of CE RBs available in the cluster.

4. The method as claimed in claim 1, wherein the step of assigning the non-overlapping portion from the CE frequency band to the CE UEs in each cell of the cluster based on at least one number of the UEs associated with the CE UEs in each cell, further comprises:
   calculating a CE weight for each cell of the cluster according to the number of non-real time CE UEs and the number of real time CE UEs in each cell; and calculating the number of CE RBs in the CE frequency band to be assigned to the CE UEs in each cell of the cluster based on the calculated CE weight of each cell.

5. The method as claimed in claim 3 or claim 4, wherein the step of assigning the non-overlapping portion from the CE frequency band to CE UEs in each cell of the cluster based on at least one number of the UEs associated with the CE UEs in each cell further comprises:
sorting cells of the cluster by the number of CE RBs assigned to the cells respectively;
assigning allocation priority to each cell of the cluster according to the number of CE RBs assigned to the cell; and
determining an initial location of CE RBs in the CE frequency band to be assigned to each cell of the cluster according to the allocation priority assigned to each cell.

6. The method as claimed in claim 3 or claim 4, wherein the step of assigning the non-overlapping portion from the CE frequency band to the CE UEs in each cell of the cluster based on at least one number of the UEs associated with the CE UEs in each cell, further comprises:
sorting cells of the cluster by the number of CE RBs assigned to the cells respectively;
assigning allocation priority to each cell of the cluster according to the number of CE RBs assigned to the cell; and
determining CE RBs in the CE frequency band to be assigned to each cell of the cluster according to the allocation priority assigned to the cell and pilot signal strength corresponding to the CE RBs in the CE frequency band, wherein the pilot signal strength is reported by the CE UEs in the corresponding cell.

7. The method as claimed in claim 1, wherein after the step of assigning the non-overlapping portion from the CE frequency band to the CE UEs in each cell of the cluster based on at least one number of the UEs associated with the CE UEs in each cell, the method further comprises:
generating a list of neighbouring and interfering cells for each cell of the cluster; and
for each cell of the cluster, re-allocating to at least one CE UE in the cell with at least one RB from the CE RBs assigned to a cell which is not in the list of neighbouring and interfering cells.

8. A communication apparatus for resource allocation in a wireless communication network, comprising:
a networking interface connected to a plurality of base station clients and a core network of the wireless communication network, and a cluster-level scheduler, wherein the cluster-level scheduler comprises:
a classifier for classifying each user equipment (UE) in each cell of a cluster to be a cell edge (CE) UE or a cell centred (CC) UE according to pilot signal strength reported by the UE;
a divider for dividing available frequency band into two non-overlapping frequency bands based on the number of CC UEs and the number of CE UEs in the cluster, wherein the two non-overlapping frequency bands includes a CE frequency band which is for CE UEs in the cluster and a CC frequency band which is for CC UEs in the cluster; and
a resource allocator for assigning non-overlapping portion from the CE frequency band to the CE UEs in each cell of the cluster based on at least one number of the UEs associated with the CE UEs in each cell of the cluster;

assigning at least one resource block (RB) from the CC frequency band to each CC UE in each cell of the cluster; and
assigning at least one RB from the non-overlapping portion assigned to the CE UEs in each cell of the cluster, to each CE UE in each cell of the cluster;
wherein the divider is configured to calculate a change factor and divide the available frequency band into the CC frequency band and the CE frequency band based on the calculated change factor,
wherein the change factor F is calculated according to the following Equation:

$$F = \frac{N_{CC}}{N_{CE} + N_{CC}}$$

wherein $N_{CE}$ refers to the number of CE UEs in the cluster and $N_{CC}$ refers to the number of CC UEs in the cluster.

9. The apparatus as claimed in claim 8, wherein the classifier is configured to determine a UE to be a CC UE by the base station server if the pilot signal strength reported by the UE in its serving cell of the cluster is greater than the pilot signal strength reported by the UE in any other cell of the cluster by a predetermined threshold; and determine a UE to be a CE UE by the base station server if the pilot signal strength reported by the UE in any cell of the cluster is not greater than the pilot signal strength reported by the UE in any other cell in the cluster by the predetermined threshold.

10. The apparatus as claimed in claim 8, wherein the resource allocator is further configured to calculate the number of CE RBs in the CE frequency band to be assigned to CE UEs in a cell of the cluster according to the following Equation:

$$R_{cellx} = \frac{U_{cellx}}{\sum U_{cellx}} \times R_{CE}$$

wherein $R_{cellx}$ is the number of CE RBs within the cell x; $U_{cellx}$ is the number of CE UEs that the cell x can serve at present instant; $\Sigma U_{cellx}$ is the total number of CE UEs in all cells within the cluster; and $R_{CE}$ is the number of CE RBs available in the cluster.

11. The apparatus as claimed in claim 8, wherein the resource allocator is further configured to
calculate a CE weight for each cell in the cluster according to the number of non-real time CE UEs and the number of real time CE UEs in the cell, and
calculate the number of CE RBs in the CE frequency band to be assigned to the CE UEs in each cell of the cluster based on the calculated CE weight of each cell.

12. The apparatus as claimed in claim 10 or claim 11, wherein the resource allocator is further configured to
sort cells of the cluster by the number of CE RBs assigned to the cells respectively;
assign allocation priority to each cell of the cluster according to the number of CE RBs assigned to the cell; and
determine an initial location of CE RBs in the CE frequency band to be assigned to each cell of the cluster according to the allocation priority assigned to each cell.

13. The apparatus as claimed in claim 10 or claim 11, wherein the resource allocator is further configured to sort cells of the cluster by the number of CE RBs assigned to the cells respectively, assign allocation priority to each cell of the cluster according to the number of CE RBs assigned to the cell; and determine the CE RBs in the CE frequency band to be assigned to each cell according to the allocation priority assigned to the cell and pilot signal strength corresponding to the CE RBs in the CE frequency band, wherein the pilot signal strength is reported by the CE UEs in the corresponding cell.

14. The apparatus as claimed in claim 8, wherein after assigning the non-overlapping portion from the CE frequency band to the CE UEs in each cell of the cluster based on at least one number of the UEs associated with the CE UEs in each cell, the resource allocator is further configured to generate a list of neighbouring and interfering cells for each cell of the cluster; and re-allocate, for each cell of the cluster, to at least one CE UE in the cell with at least one RB from the CE RBs assigned to a cell which is not in the list of neighbouring and interfering cells.

\* \* \* \* \*